United States Patent [19]
Colineau

[11] Patent Number: 5,546,255
[45] Date of Patent: Aug. 13, 1996

[54] INTEGRATED RECORDING MAGNETIC HEAD

[75] Inventor: Joseph Colineau, Bures sur Yvette, France

[73] Assignee: Thomson-CSF, Puteaux, France

[21] Appl. No.: 221,997

[22] Filed: Apr. 1, 1994

Related U.S. Application Data

[63] Continuation of Ser. No. 651,350, filed as PCT/FR90/00430, Jun. 15, 1990, abandoned.

[30] Foreign Application Priority Data

Jun. 15, 1989 [FR] France ................................. 89 08015

[51] Int. Cl.$^6$ ................................................. G11B 5/127
[52] U.S. Cl. .............................................................. 360/115
[58] Field of Search ................................ 360/115, 110, 360/113, 125, 126, 121, 111

[56] References Cited

U.S. PATENT DOCUMENTS

| | | |
|---|---|---|
| 2,995,631 | 8/1961 | Rubens . |
| 3,333,275 | 7/1967 | Guerth . |
| 3,435,440 | 3/1969 | Nallin . |
| 3,662,361 | 5/1972 | Mee . |
| 3,686,467 | 8/1972 | Camras . |
| 4,107,742 | 8/1978 | Levy . |
| 4,322,763 | 3/1982 | Lemke . |
| 4,979,064 | 12/1990 | Mage et al. ............................. 360/125 |
| 4,985,795 | 1/1991 | Gooch ..................................... 360/115 |
| 5,025,341 | 6/1991 | Bousquet et al. ....................... 360/120 |
| 5,050,027 | 9/1991 | Meunier et al. ........................ 360/122 |
| 5,089,923 | 2/1992 | Lehureau ................................ 360/115 |
| 5,153,796 | 10/1992 | Gooch .................................... 360/115 |

FOREIGN PATENT DOCUMENTS

| | | |
|---|---|---|
| 336207 | 3/1959 | European Pat. Off. . |
| 8203938 | 11/1982 | European Pat. Off. . |
| 0195590 | 9/1986 | European Pat. Off. . |
| 51-113716 | 10/1976 | Japan . |
| 5189718 | 7/1993 | Japan ..................................... 360/111 |
| 0862205 | 9/1981 | U.S.S.R. ................................. 360/115 |
| 782572 | 9/1957 | United Kingdom . |
| 819134 | 1/1960 | United Kingdom . |
| 8703729 | 6/1987 | WIPO ..................................... 360/115 |

OTHER PUBLICATIONS

IBM Technical Disclosure Bulletin—Scanned recording by utilizing coercivity characteristics of a recording media (vol. 7 No. 6 Nov. 1964).

Primary Examiner—Robert S. Tupper
Assistant Examiner—Allen Cao
Attorney, Agent, or Firm—Oblon, Spivak, McClelland, Maier, & Neustadt, P.C.

[57] ABSTRACT

The magnetic recording head of the invention comprises an electrical conductor constituted by the poles themselves or by a magnetic shunt, which gets saturated when an electrical current is sent to it. It is thus possible to control the field at the gap and control the recording by this electrical current which acts by inhibition or validation of the writing, respectively.

11 Claims, 4 Drawing Sheets

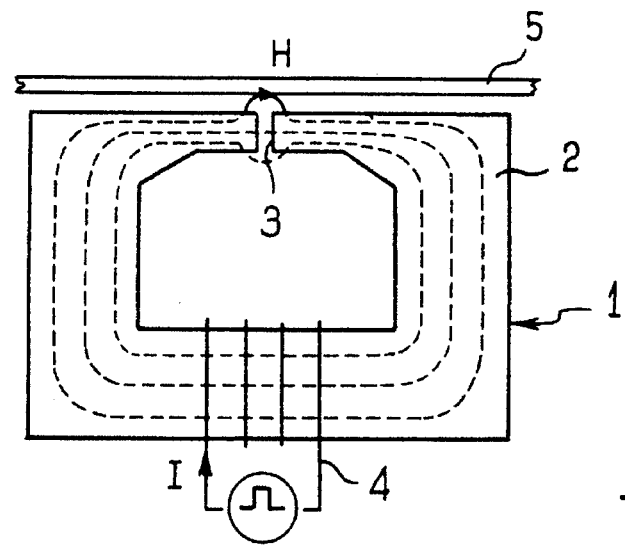
FIG_1
PRIOR ART
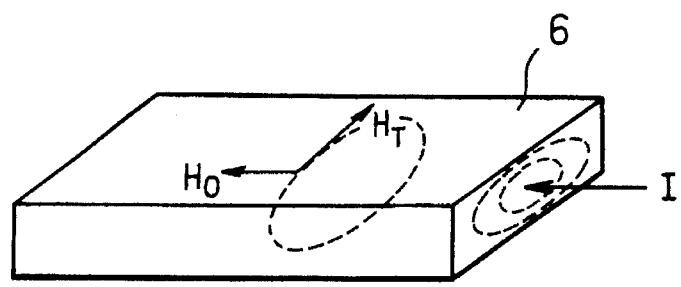
FIG_2
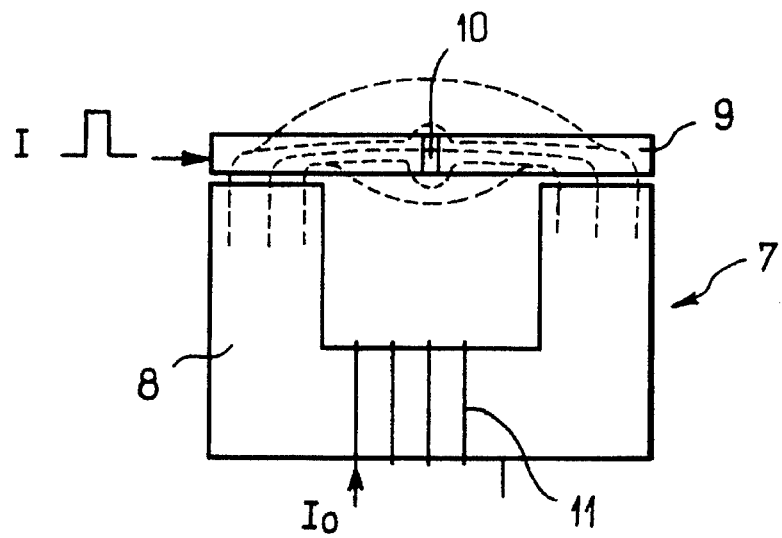
FIG_3

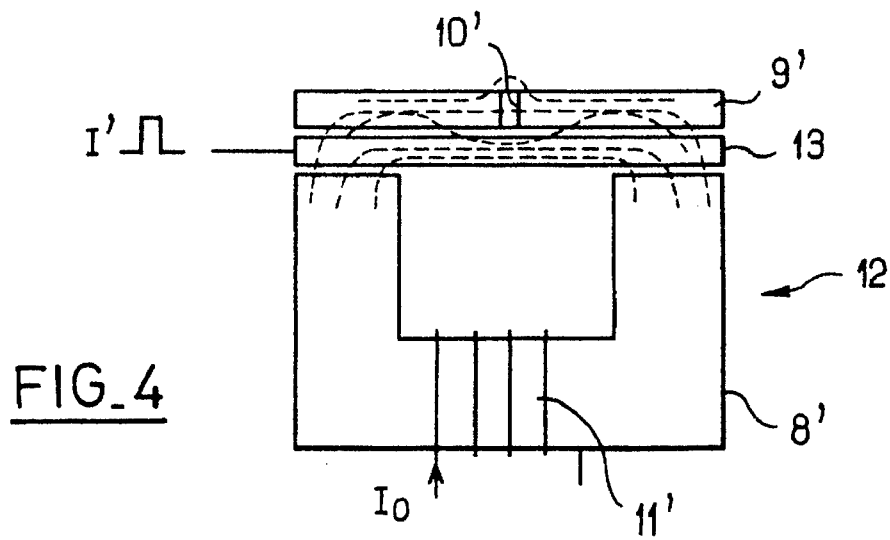
FIG._4
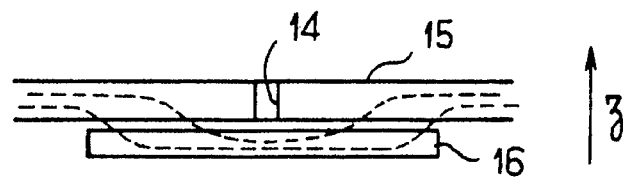
FIG._5A
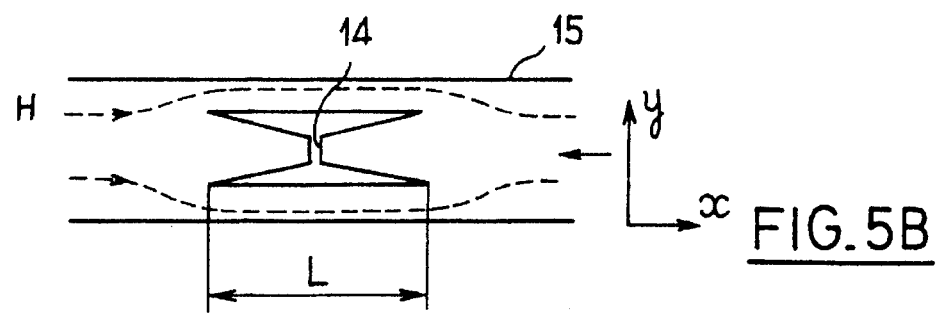
FIG._5B
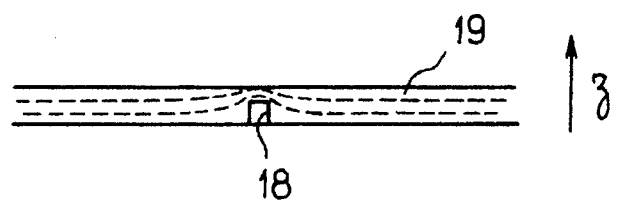
FIG._5C
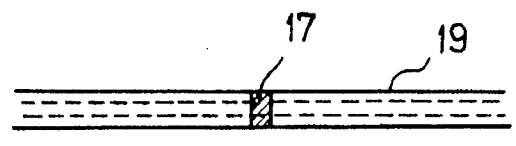
FIG._5D

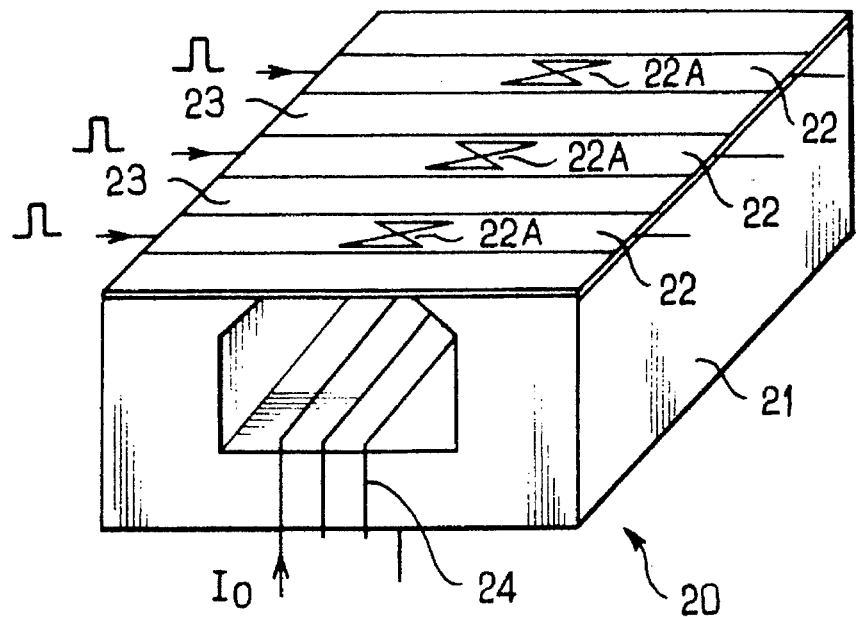
FIG._7
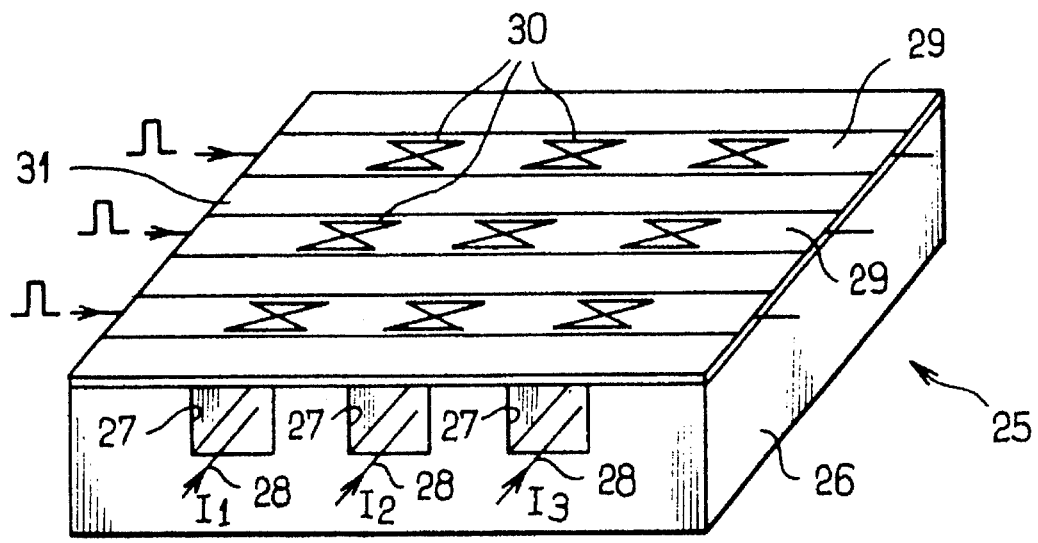
FIG._8

5,546,255

INTEGRATED RECORDING MAGNETIC HEAD

This application is a continuation of application Ser. No. 07/651,350, filed as PCT/FR90/00430, Jun. 15, 1990, now abandoned.

BACKGROUND OF THE INVENTION

1. Field of the Invention

The present invention relates to an integrated recording magnetic head.

2. Discussion of the Background

There are many known types of integrated magnetic heads with dense networks of micro-heads. Most of these heads require a winding in thin layers for each micro-head forming the magnetic heads, which restricts their use to instruments requiring only a small number of micro-heads.

SUMMARY OF THE INVENTION

The object of the present invention is a magnetic recording head requiring the minimum possible number of windings and having good recording characteristics.

Another object of the invention is an integrated recording magnetic head with a matrix structure having the greatest possible number of micro-heads or a substrate with limited dimensions, without its performance characteristics being thereby adversely affected.

The magnetic recording head according to the invention is characterized in that it is made of a magnetic material having, locally, a zone saturable by a current flowing in this material or in an electrical conductor located in the immediate vicinity of the magnetic material to be saturated.

BRIEF DESCRIPTION OF THE DRAWINGS

The present invention will be understood more clearly from the detailed described of several embodiments, taken as non-restrictive examples and illustrated by the appended drawing, wherein:

FIG. 1 is a simplified sectional view of a prior art magnetic head;

FIG. 2 is a view in perspective of a part of the magnetic material, used to explain the principle of its modification of permeance;

FIGS. 3 and 4 are simplified sectional views of two embodiments of magnetic heads according to the invention;

FIGS. 5A to 5D are simplified sectional views of magnetic shunts that can be used in the magnetic head of the invention;

FIGS. 7 and 8 are simplified partial views of multiple-track magnetic heads according to the invention.

DESCRIPTION OF THE PREFERRED EMBODIMENT

Figure 6A:
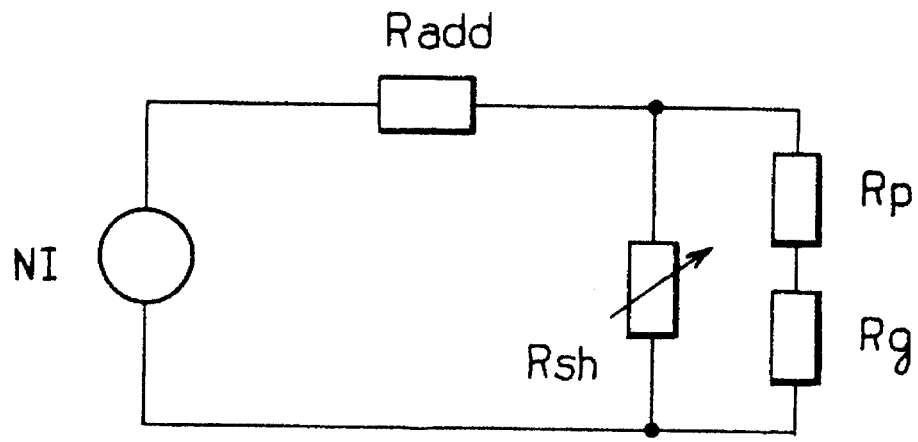
FIGS. 6A and 6B are equivalent electrical diagrams of magnetic heads according to the invention.

FIG. 1 shows a standard magnetic head 1, the magnetic circuit 2 of which is closed, except for a gap 3. The magnetic circuit 2 is crossed by a magnetic flux (symbolized by dashed lines) generally generated by a coil 4.

The gap 3 makes it possible to bring the flux out of the magnetic circuit and to create a field H capable of magnetizing the recording medium 5 (magnetic tape or disk) running before this gap.

The information to be recorded is applied directly or after addition to a carrier, in the form of a current flowing through the coil 4. It is therefore the flux in the magnetic circuit that is modulated by the information to be recorded.

The invention proposes to bring about variations in the field in the gap by modulating the permeance of the gap and/or of the poles of the magnetic head, or of magnetic pieces located in the vicinity of the poles. Thus, the invention makes it possible to dissociate the production of the magnetic flux from the control of this flux.

To modify the permeance of a part of a magnetic circuit (FIG. 2), an electrical current I is injected directly into the material 6 constituting this magnetic circuit part. According to one variant, this current is injected into an electrical conductor located in the immediate vicinity of this magnetic material.

The current I creates a field $H_o$, perpendicular to the excitation field $H_T$, that is sufficiently intense to bring a part of the volume of the material 6 to saturation. The permeability of this magnetic circuit part then becomes appreciably lower than when there is no current I, and the magnetic flux flowing in the gap made in the magnetic circuit can then be modulated by means of the modulation of this current I.

This method for controlling the magnetic flux may be implemented in a magnetic head in two ways, as explained here below with reference to FIGS. 3 and 4.

The magnetic head 7 of FIG. 3 has a massive, substantially U-shaped magnetic circuit 8 and a flux-closing part or pole piece 9 in which a gap 10 is made. The pole piece 9 is, advantageously, electrically insulated from the circuit 8. A coil 11, wound on an arm of the circuit 8 and supplied with a current Io, produces a magnetic flux in the circuit 8-9-10. To control this flux, a variable current I, for example a sequence of pulses, is made to pass into the pole piece 9. When this current I has a sufficient value, it prompts the inhibition of the writing by the head 7 through a decrease in the permeance of the pole piece 9, the result of which is that, thereafter, almost no writing flux leaves through the gap 10.

The magnetic head 12 of FIG. 4 has a massive, U-shaped magnetic circuit 8, similar to the circuit 8 of FIG. 3. This circuit 8' cooperates with a flux-closing part or pole piece 9' similar to the piece 9 and provided with a gap 10', but a piece 13, made of magnetic material, is interposed between the circuit 8' and the piece 9' and is electrically insulated from these two elements. According to one variant, not shown, the positions of the pieces 9' and 13' are permutated, the result of which is that the piece 9' is interposed between the elements 8' and 13. A coil 11', similar to the coil 11, produces a magnetic flux in the magnetic circuit 8'-9'-10'.

Since the injection of a variable current I' in the piece 13 plays the role of a magnetic shunt when it is not crossed by any current, this injection actually lowers the magnetic permeability, to the point where it practically absorbs no magnetic flux flowing in the part 8'. The magnetic head 12 then produces a flux, in the gap 10', sufficient to enable writing on the magnetic medium that passes before the gap 10'. As a consequence, the flow of the current I' in the piece 13 validates the writing of the magnetic head.

The energy balances of the two heads of FIGS. 3 and 4 are not equivalent:

with the head of FIG. 3 it is necessary, in order to make a single-head device operate, to maintain the control or inhibition current I for at least half the time for which the head is used. If we use a recording device comprising a network of such heads with multiplexing of their control, then the inhibition current must be given with a cyclical ratio greater than n-1/n, n being the number of control lines of the multiplexed device, on the contrary, with the head of FIG. 4, a very short current pulse (typically of the order of 50 ns) is enough to create a writing field and to record a magnetic domain on the recording medium. In the case of a multiplexed matrix device, it is enough to give the validation current with a cylical ratio close to zero (smaller than 1/n, n being as defined here above).

The value of the magnetic head of the invention lies in the possibility of making very small-sized magnetic heads and of addressing them according to an original sequential process. The preferred application of the magnetic head of the invention is therefore the possibility of multiple-head devices with matrix structure.

Here below, we shall describe several embodiments of magnetic heads and, especially, their polar zone, in the instance where the writing validation is obtained by a control current (the instance of FIG. 4).

These embodiments make use of the technique of thin-layer deposition, especially for the fabrication of the poles and of the gap, this fabrication being known per se. The magnetic shunt, made of an electrically conductive material, is also made according to this technique, in the same plane as the poles or in a parallel plane.

In normal times, the shunt lines are canalized by this magnetic shunt. By making an appropriate choice of the geometrical dimensions and/or the characteristics of the magnetic materials, it is possible to reduce the leakage field of the gap to a very low value.

When a current I that saturates the magnetic shunt is injected into it, then the magnetic flux flows chiefly in the poles of the head, and a high leakage field prevails in the vicinity of the gap, enabling recording on the magnetic medium that runs before the gap.

The dimensions, the shape and the magnetic characteristics of the magnetic shunt should be chosen in such a way that the ratio of the fields in the presence or absence of the control current should be as high as possible.

It is, moreover, advantageous to make provision, in the magnetic circuit of the recording head, for a secondary gap or for any other means of increasing the total reluctance of the magnetic circuit. A means such as this has the role of making the total flux that flows in the magnetic circuit relatively insensitive to the variations in permeance of the magnetic shunt. This secondary gap further makes it possible to avoid the saturation of the magnetic shunt when there is no control current. Means such as this are shown in FIGS. 5A to 5B.

The embodiment of FIGS. 5A and 5B (5A: sectional view; 5B: top view) pertains to the case where the gap 14 made in a pole 15 of a magnetic head has a length L that is not negligible as compared with that of the magnetic shunt 16. This gap 14 is roughly shaped like a bow-tie, in which the tongues of the central part mutually define the main gap. The value of such an embodiment is that a substantial modulation is obtained in the reluctance of the magnetic shunt with a fairly low control current. The structure of this embodiment is obtained by the deposition of successive layers of magnetic materials on the structure of the rest of the magnetic head, or in the plane of the magnetic poles of this head. The making of the layers in the plane of the poles enables a simplification of the technology. Furthermore, the magnetic shunts may then act as shielding elements between micro-heads of a head with a dense network of micro-heads.

FIGS. 5C and 5D show a magnetic shunt 17 localized within the gap 18 made in the poles 19. This shunt may also be positioned in the immediate vicinity of the gap. These structures are the most compact ones. However, they offer fewer degrees of liberty for the optimization of the magnetic head, and call for a greater control current to achieve the modulation of the magnetic flux.

Figure 6B:
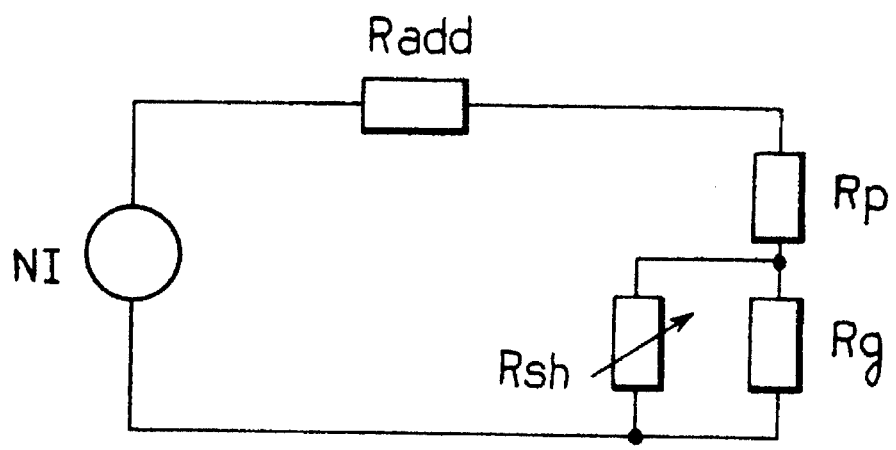

FIGS. 6A and 6B show models in the form of equivalent electrical diagrams of the embodiments of FIGS. 5A to 5D. In these FIGS. 6A and 6B, NI represents the magnetomotive force applied to the head, Rg represents the reluctance of the gap, Rsh the magnetic shunt, Rp the reluctance of the magnetic poles and Radd the additional reluctance achieved, for example, by means of a secondary gap.

FIG. 6A pertains to the case where the magnetic shunt is relatively long and acts both on the poles and on the gap (as in the case of FIGS. 5A and 5B) while FIG. 6B pertains to the case where the magnetic shunt is relatively small and practically acts only on the gap (as in FIGS. 5C, 5D).

The material used for the shunt may be the same as that of the magnetic poles. It is then possible to play on the geometrical or magnetic characteristics (for example by means of a local treatment of the material, such as a heat treatment, ion implantation etc.), for example to reduce its magnetization at saturation or to give the material of this shunt an anisotropy transversal to the excitation field and to make it thus more easily saturable.

Naturally, the material of the magnetic shunt may be different from that of the magnetic poles, the choice of this material depending on the characteristics that are to be obtained.

We have just described embodiments with single recording heads, i.e. with recording on a single track (or a small number of tracks) on a magnetic tape, but it is quite clear that the characteristics of this single head can be applied to a multiple head, espcially a head having a dense network of micro-heads.

Since the invention makes it possible to separate the functions of magnetic flux production and of the control of this flux, there is no longer any need to provide each micro-head, in a multiple head, with an individual excitation coil. It is therefore possible to fabricate multiple heads with a high degree of integration, especially by using a planar technology, for example of the type described in the French patent application No. 86 14974.

A first embodiment of a multiple head is shown in FIG. 7. The head part 20 shown relates to a part of a column of micro-heads. On the U-shaped, common, massive magnetic circuit 21, poles 22 are formed. These poles 22 are parallel to one another and are similar to those of FIGS. 5A, 5B, and they have gaps 22A, each of which determines a micro-head. These poles 22 are separated by bands 23 made of an electrically insulating material. A coil 24 magnetizes the circuit 21 and produces the same magnetic flux in all the poles. Writing validation current pulses are sent to the different micro-heads. The coil 24 may receive a DC or AC current excitation. If the number of micro-heads is high (typically 100 to 2000), it is preferable to use a multiplexing circuit to reduce the number of output connections.

FIG. 8 shows a multiple-track magnetic head part 25 with a Cartesian network of micro-heads.

The procedure for making the head 25 starts with a magnetic substrate, for example a ferrite block. In this block 26, a series of n parallel grooves 27 (only three have been shown) are made, in each of which excitation conductors 28 are deposited or wound, forming coils for the production of flux to be modulated. It is then advantageously possible to fill the grooves 27, provided with their conductors 28, with non-magnetic material such as glass, the surface of which is then smoothed and even polished. Then, on the block 26, parallel bands of pole pieces 29 are deposited, each having m gaps 30 such as the one shown in FIGS. 5A, 5B for example. The bands 29, made of an electrically conductive magnetic material, are separated by bands 31 made of an electrically insulating magnetic material. In one exemplary embodiment, m and n are at least equal to 16. Thus, we obtain a magnetic head with a matrix structure of n lines of m columns of magnetic micro-heads. A set of n pieces of elementary information (for example, the successive binary elements of a digital signal) is applied to the n excitation conductors. The line of heads that has to be activated at a given instant then receives a control pulse that enables the pieces of information sent to magnetic head to be recorded on the n corresponding tracks (the magnetic head is positioned in relation to the magnetic tape on which it has to perform the recording in such a way that the n micro-heads of one and the same line, i.e. those positioned on the same pole band 29, record n successive tracks of this band). The pieces of information corresponding to a second line of micro-heads are then presented to the head, and this second line, in turn, receives a writing pulse, and so on and so forth.

The structure of a head 25 is such as this is a matrix structure, thus enabling the integration of a large number of micro-heads on a small-sized substrate, with a limited number of connections. The working of this head may be multiplexed, i.e. the pieces of information to be written may be sent in successive groups.

I claim:

1. A magnetic recording head comprising:

a substantially U-shaped magnetic circuit;

a flux-closing pole piece having a permeability which is variable by applying a variable electric current to the flux-closing pole piece; and a stationary fixed gap formed as a physical discontinuity in the flux-crossing pole piece for generating a magnetic flux for magnetically writing on a magnetic recording medium;

wherein when the variable electric current applied to the flux-closing pole piece exceeds a predetermined positive value to decrease a permeability of the pole piece, no magnetic flux is generated by the stationary fixed gap.

2. A magnetic recording head comprising:

a substantially U-shaped magnetic circuit;

a flux-closing pole piece;

a stationary fixed gap formed as a physical discontinuity in the flux-crossing pole piece for generating a magnetic flux for magnetically writing on a magnetic recording medium;

an electrical conductor located between the flux-closing pole piece and the U-shaped magnetic circuit and operating as a magnetic shunt, wherein a variable electric current is applied to the electrical conductor, and when the variable electric current applied to the electrical conductor exceeds a predetermined positive value, a permeability of the electrical conductor is lowered and the electrical conductor absorbs no magnetic flux, thereby the stationary fixed gap in the flux-closing pole piece generates the magnetic flux for magnetic recording on the magnetic recording medium.

3. The magnetic recording head according to claim 2, further comprising means for increasing a total reluctance of the magnetic circuit.

4. The magnetic recording head according to claim 3, wherein the means for increasing the total reluctance of the magnetic circuit is a secondary stationary fixed gap.

5. The magnetic recording head according to claim 2, wherein the electrical conductor is positioned in the vicinity of the stationary fixed gap of the flux-closing pole piece.

6. The magnetic recording head according to claim 2, wherein the electrical conductor is positioned in the stationary fixed gap of the flux-closing pole piece.

7. The magnetic recording head according to claim 2, wherein the material of the electrical conductor is the same as that of the flux-closing pole piece.

8. The magnetic recording head according to claim 2, wherein magnetic qualities of the electrical conductor are adjusted by a local processing of a material constituting the electrical conductor.

9. The magnetic recording head according to claim 8, wherein the local processing is a thermal processing.

10. The magnetic recording head according to claim 8, wherein the local processing is done by ion implantation.

11. The magnetic recording head according to claim 8, wherein at least one of the flux-closing pole piece and the stationary fixed gap are made by deposition in thin layers.

* * * * *